UNITED STATES PATENT OFFICE.

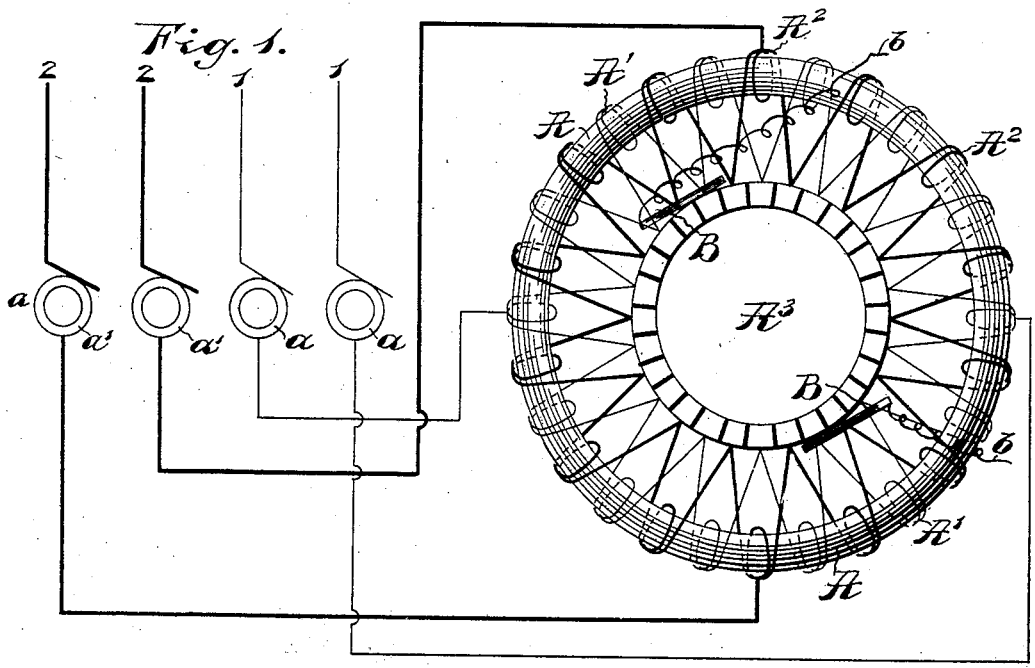

ALEXANDER CHURCHWARD, OF CHICAGO, ILLINOIS.

ROTARY TRANSFORMER.

SPECIFICATION forming part of Letters Patent No. 708,025, dated September 2, 1902.

Application filed June 12, 1899. Serial No. 720,156. (No model.)

*To all whom it may concern:*

Be it known that I, ALEXANDER CHURCHWARD, of Chicago, in the county of Cook and State of Illinois, have invented certain new and useful Improvements in Rotary Transformers, of which the following is a specification.

This invention relates to rotary transformers for changing alternating electric currents to continuous currents, or vice versa, by means of a rotary armature the coils of which are connected both in the alternating circuit or circuits by collector-rings and in the continuous-current circuit through a commutator; and it relates more particularly to improvements in that class of such rotary transformers as are constructed and used for polyphase-current work. In such machines as heretofore constructed the armatures have customarily been of the single-winding type—i. e., the armature has had but one winding, which was tapped off at the necessary intervals to give the required phase differences, accordingly as the apparatus was used in a single, two, or three phase system. The objection to this construction in a polyphase machine is that the phases are thereby interconnected, so that any irregularity or change in either will react on the others through their common armature-winding and render it difficult or impossible to operate successfully if the phases are unbalanced or to run satisfactorily with the remaining phase or phases if one phase fails. Furthermore, unless the system is carefully balanced, as is frequently impossible on long transmission-lines, there is liable to be excessive flashing or sparking at the commutator, owing to the comparatively high voltage between the commutator-bars. To avoid these objections, my invention contemplates the provision on the armature of a separate winding and separate collector-rings and a set of commutator-bars for each phase. For example, in a two-phase machine I provide two separate windings which may be placed in the same slots, each having half the cross-section of copper which would be used for a single winding for the same machine, so that the quantity of copper is approximately the same in both cases. Each of these windings is then connected with a separate pair of collector-rings and with a separate set of commutator-bars which may be combined in a single commutator or may be divided into separate commutators, as found desirable. In either case the phases may be regulated independently of each other and neither will be affected by any alteration in or cessation of the other. Moreover, the provision of two sets of commutator-bars greatly reduces the voltage between the bars and the likelihood of flashing or sparking at the brushes.

The invention consists in the matters herein set forth, and particularly pointed out in the appended claims, and will be fully understood when considered in connection with the accompanying drawings, in which—

Figure 1 is a diagrammatic view showing the windings and connections of the armature of a transformer designed in accordance with my invention. Fig. 2 is a somewhat diagrammatic representation of an armature which is also constructed in accordance with the invention, but provided with two commutators instead of one, as in the first diagram.

As shown in Fig. 1, A designates the armature, represented diagrammatically, of a rotary transformer designed for a two-phase system of transmission, $a$ $a$ collector-rings which are connected in the circuit 1 of the two-phase system, and $a'$ $a'$ collector-rings which are connected in the other circuit 2 of said system. In accordance with my invention said armature is provided with two separate windings $A'$ and $A^2$, of which the first is connected by suitable taps with the collector-rings $a$ $a$, while the second is connected with the collector-rings $a$ $a'$. Each winding consists of any desired number of coils connected in series to each other and also suitably connected with the bars of the commutator $A^3$, as shown, a different set of commutator-bars being, however, provided for each of the two separate windings $A'$ and $A^2$. Commutator-brushes B then transmit the current to the leads $b$ of the continuous-current circuit. Having no common winding, the phases in this construction are independent of each other, so that variations or changes in the one do not directly affect the other or prevent either from being independently adjusted. The two separate windings, furthermore, permit of the provision of double the number of commutator-bars without encroaching upon the limits imposed by considerations of frequency, and thus by reducing the voltage between each two adjacent bars greatly lessens the tendency toward sparking or flashing. It is not essential to the improvement, however, that the two sets of commutator-bars be combined in a single commutator, as in the construction thus described and illustrated in Fig. 1; but they may be divided into separate commutators, from which brushes B' and B² transmit the current to the leads b' and b², which may form independent continuous-current circuits or may be connected in series or multiple, as desired.

Although thus described in connection with a two-phase machine, it will be understood that the same principles of construction will apply to rotary transformers designed to work in three or more phase systems, in which cases three or more separate windings and pairs of collector-rings and three or more times the number of commutator-bars would be provided, with a corresponding advantage in the matter of regulation of the different phases and in the commutation and lessening of the tendency toward flashing and sparking.

I claim as my invention—

1. A rotary transformer for multiphase systems provided with a plurality of armature-windings corresponding in number to the number of phases in the system, a separate pair of collector-rings connected with each winding, and a separate set of commutator-bars connected with each winding, whereby the phases are maintained independent of each other.

2. A rotary transformer for multiphase systems provided with a plurality of armature-windings corresponding in number to the number of phases of the system, a separate pair of collector-rings connected with each winding, and a separate commutator for each winding.

In testimony that I claim the foregoing as my invention I affix my signature, in presence of two subscribing witnesses, this 6th day of June, A. D. 1899.

ALEXANDER CHURCHWARD.

Witnesses:
HENRY W. CARTER,
ALBERT H. GRAVES.